(12) United States Patent
Kauhaniemi et al.

(10) Patent No.: US 7,082,196 B2
(45) Date of Patent: Jul. 25, 2006

(54) FLEXIBLE STRUCTURE, HINGE, SHUTTER, MOBILE COMMUNICATIONS APPARATUS AND MOBILE TELEPHONE

(75) Inventors: Ilpo Kauhaniemi, Vantaa (FI); Antti Ronkko, Espoo (FI)

(73) Assignee: Nokia Corporation, Espoo (FI)

( * ) Notice: Subject to any disclaimer, the term of this patent is extended or adjusted under 35 U.S.C. 154(b) by 252 days.

(21) Appl. No.: 10/610,978

(22) Filed: Jun. 30, 2003

(65) Prior Publication Data
US 2004/0266496 A1 Dec. 30, 2004

(51) Int. Cl.
H04M 1/00 (2006.01)
H04M 9/00 (2006.01)

(52) U.S. Cl. .................. 379/447; 379/433.13
(58) Field of Classification Search ............. 379/447, 379/446, 454, 433.13; 160/84.04, 10
See application file for complete search history.

(56) References Cited

U.S. PATENT DOCUMENTS 5,713,621 A * 2/1998 Krenkel et al. ............... 160/10
6,371,189 B1   4/2002 Azoulai ..................... 160/133
6,640,867 B1 * 11/2003 Pallotta et al. .......... 160/84.04

* cited by examiner

Primary Examiner—Benny Quoc Tieu
(74) Attorney, Agent, or Firm—Harrington & Smith, LLP

(57) ABSTRACT

The invention relates to a flexible structure, a hinge and a shutter comprising such flexible structure. The invention further relates to a mobile communications apparatus and a mobile telephone comprising such hinge or shutter. The flexible structure comprises a plurality of elongated bars having a length axis and being connected to each other, wherein:
  the bars are arranged mainly parallel to each other,
  each bar has a first end part, a second end part and a middle part between the end parts,
  at least two neighboring parallel bars are connected to each other by a connector at their point of connection.

Figure 5:
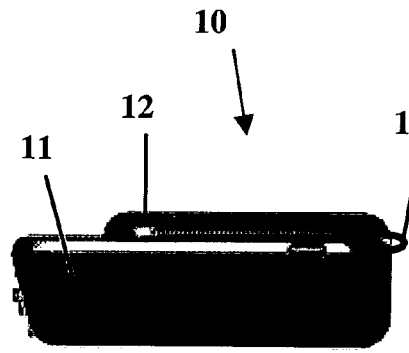

At least some of the parallel bars are elastic in such a way that the first end part and the second end part of one bar are arranged rotatable in relation to each other around the length axis of the bar.

21 Claims, 4 Drawing Sheets

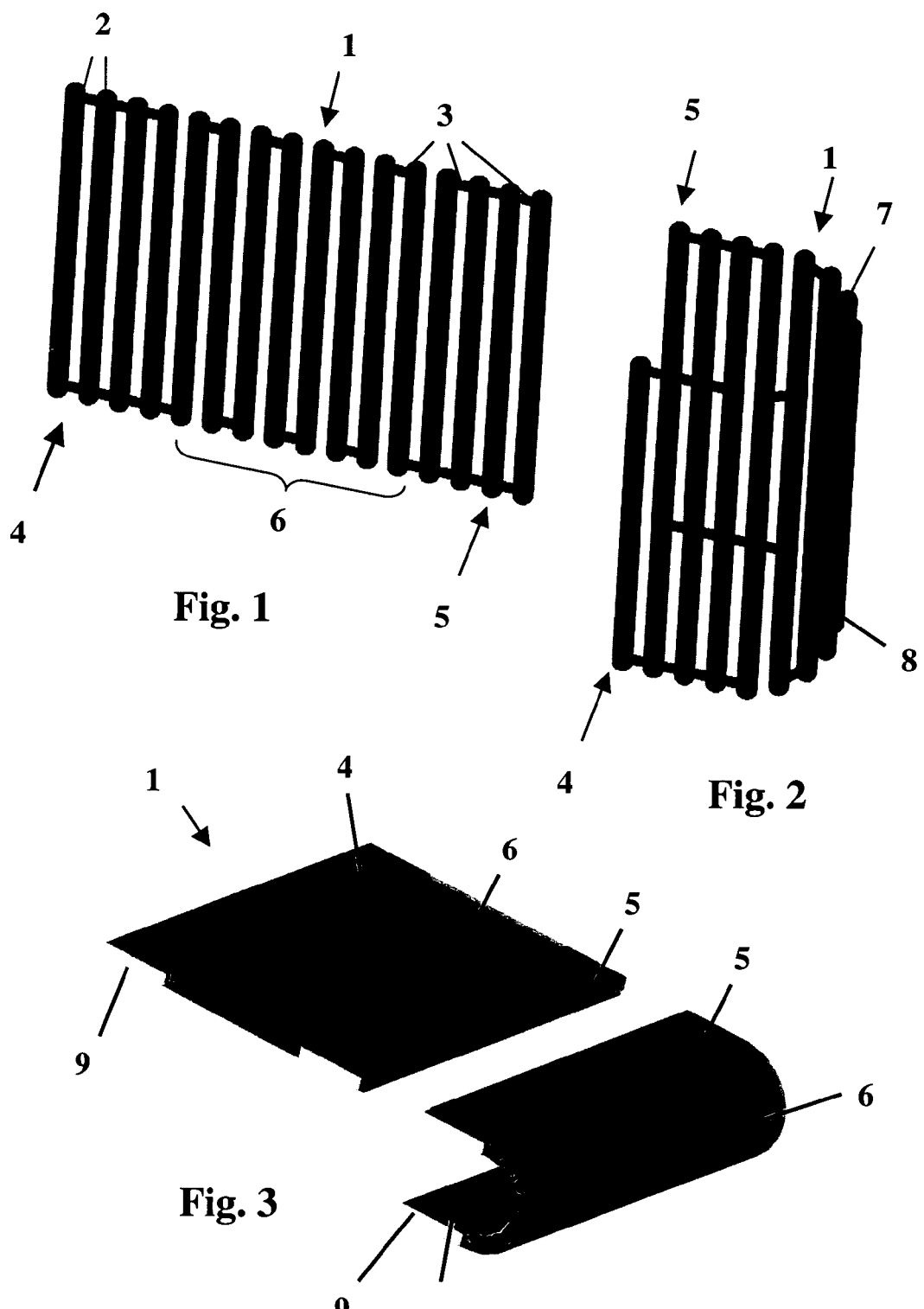

FLEXIBLE STRUCTURE, HINGE, SHUTTER, MOBILE COMMUNICATIONS APPARATUS AND MOBILE TELEPHONE

FIELD OF THE INVENTION

The invention relates to a flexible structure and a hinge, a shutter and a flexible display arrangement comprising such flexible structure. Further, the invention relates to mobile communications apparatuses and mobile telephones comprising a hinge or a shutter structure according to the invention. In particular, the invention relates to a novel and inventive way of constructing a robust flexible structure by connecting a plurality of parallel bars together in an inventive manner. Such flexible structure is suitable for a variety of uses, especially in a mobile communications apparatus.

PRIOR ART

Reliable, simple and economical flexible structures are needed in a variety of industries for different purposes. E.g. hinges and many kinds of covers are examples of commonly used articles that can be realized with suitable flexible structures.

For instance, a mobile communications or telecommunications apparatus, such as a mobile telephone, may comprise multiple parts arranged together by a hinge. Such a hinge must be sufficiently robust in order to endure frequent and often quite rough use. At the same time a hinge of a mobile telecommunications apparatus should be as small and as light-weighted as possible. In telecommunications apparatuses and other electric apparatuses, which comprise more than one parts joined together by a hinge, it is often a problem to provide a reliable electric connection or data connection between the two or more parts. It is often preferable that a hinge provides some spring effect, i.e. that when opened, a hinge would have tendency to resist the movement. Such spring effect has been realized with for instance separate springs that make the structures more unreliable. Naturally, all of the aforesaid preferable qualities apply for hinges in many different applications.

Many kinds of apparatuses, for example mobile communications or telecommunications apparatuses, such as mobile telephones, may comprise parts or components that need periodic or intermittent covering. Sensitive elements such as lenses of digital cameras need simple but reliable protection, e.g. a shutter, when not used. In some applications a flexible shutter would be preferred.

There are a number of disadvantages in the prior art solutions comprising a flexible structure. Prior art hinges, coverings and shutters have many disadvantages, e.g. they often fail to be robust, light-weighted, user-friendly or economical. Present shutters and hinges often have a complicated structure. Several separate parts are normally needed in prior art to accomplish a hinge for a foldable mobile communications apparatus or the like. Separate parts need more transportation and storage capacity. It is difficult to accomplish reliable joints between many different parts and e.g. the cover of a mobile phone. Normal use of an electric apparatus, such as a mobile telephone causes such bending and distortion to the structure of the apparatus that easily results in loosening of the separate parts. Also changes in temperature conditions cause faults and leaks in the prior art solutions. Flexible displays are easily broken due to excessive distortion or bending.

OBJECT AND SUMMARY OF THE INVENTION

The object of the present invention is to achieve a flexible structure, a hinge, a shutter and a flexible display arrangement comprising such flexible structure whereby the above described drawbacks of the prior art can be minimized.

Further, the object of the present invention is to achieve a mobile communications apparatus and mobile telephone comprising a hinge or a shutter structure according to the invention.

The object of the present invention is especially to achieve a mobile communications or telecommunications apparatus, a mobile telephone and a flexible display arrangement, which is robust, light-weighted and user-friendly as well as easy and economic to produce. A further object of the present invention is a reliable hinge and shutter construction on a mobile telecommunications apparatus or on a mobile phone.

A typical flexible structure according to the invention comprises a plurality of elongated bars having a length axis and being connected to each other, wherein:
  the bars are arranged at least mainly parallel to each other,
  each bar has a first end part, a second end part and a middle part between the end parts,
  at least two neighboring parallel bars are connected to each other by a connector at their point of connection, at least some of the parallel bars are elastic in such a way that the first end part and the second end part of one bar are arranged rotatable in relation to each other around the length axis of the bar.

A typical hinge structure and a shutter structure according to the invention comprise the flexible structure according to the invention. A typical mobile communications apparatus and a typical mobile telephone according to the invention each comprise a hinge structure or a shutter structure according to the invention. Mobile communications apparatus could be e.g. a PDA, that is a personal digital assistant, or a portable computer or a GPS receiver.

With the help of the invention, many applications, e.g. portable electronic apparatuses and their hinges and shutters become simple, economic and reliable due to the simple and robust structure of the flexible structure according to the invention.

A BRIEF DESCRIPTION OF THE DRAWINGS

Figure 6:
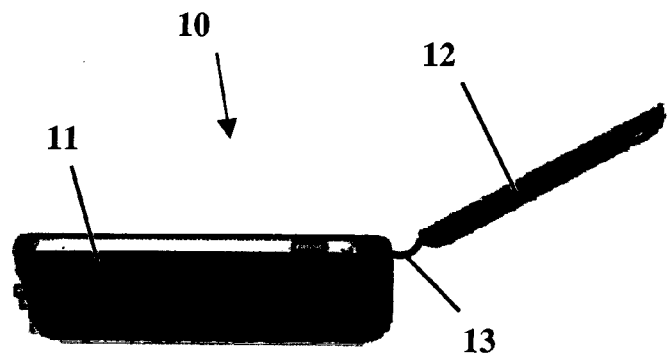
Figure 7:
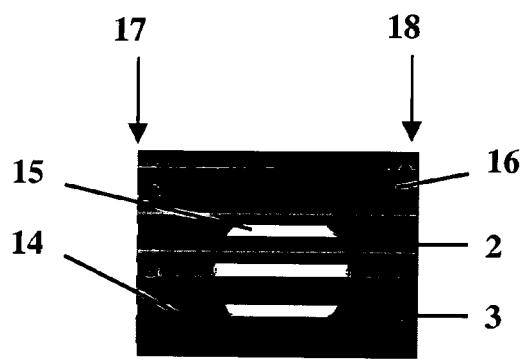
Figure 9:
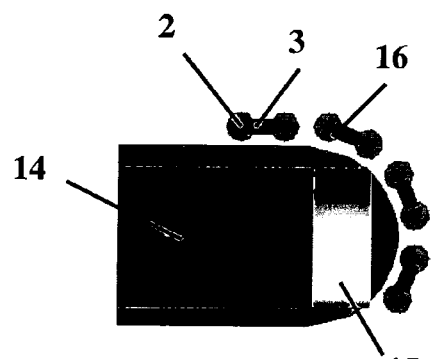
Figure 8:
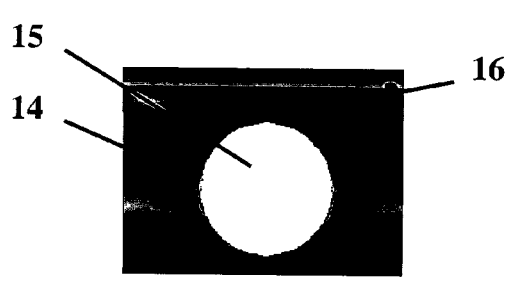
Figure 10:
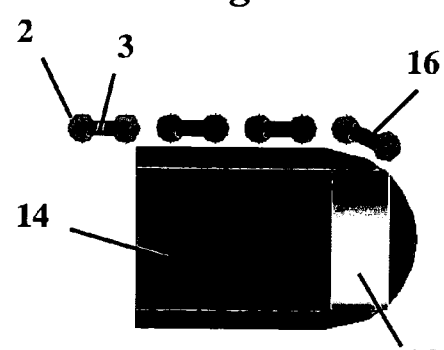
Figure 11:
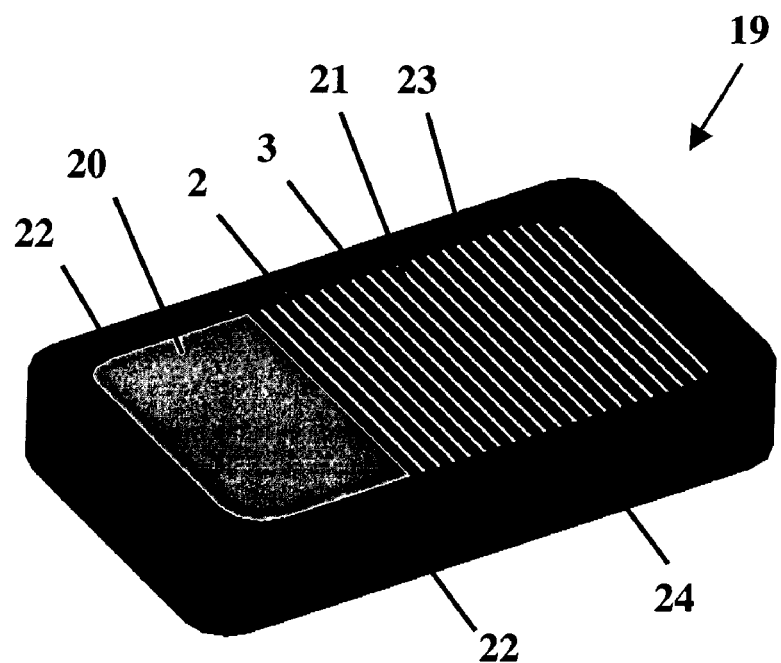
Figure 12:
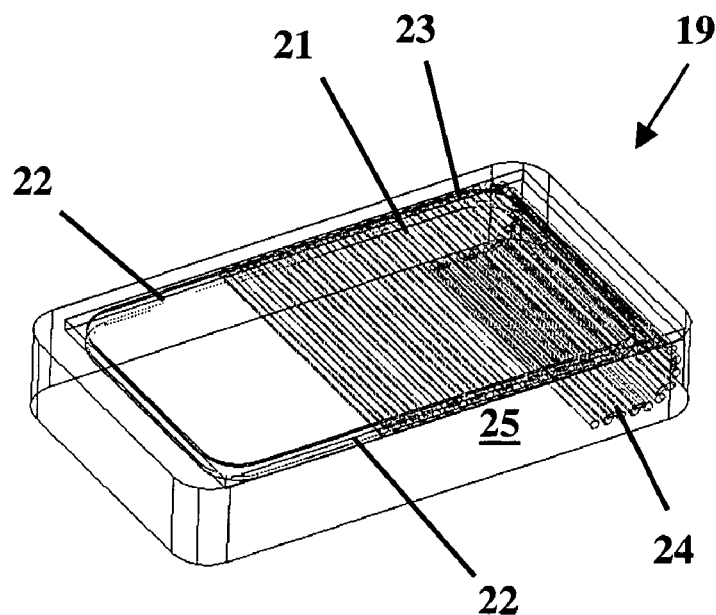
Figure 13:
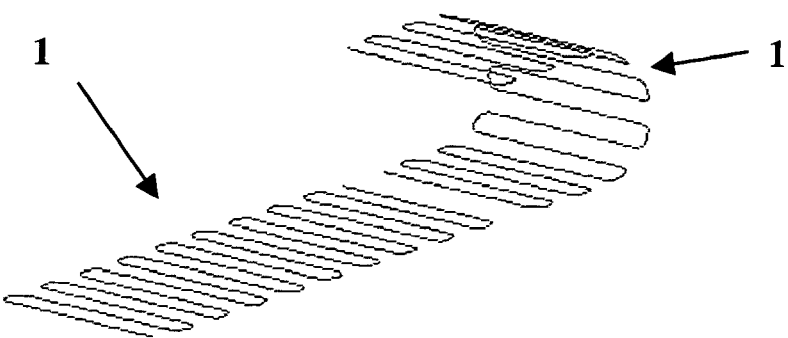
Figure 14:
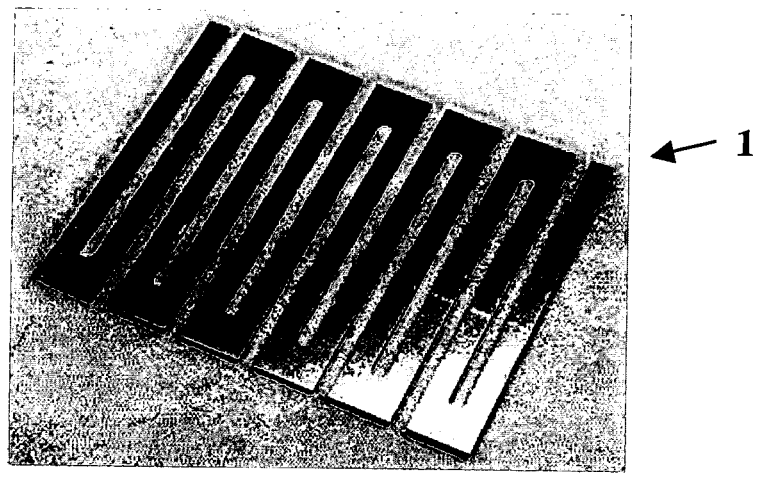
Figure 15:
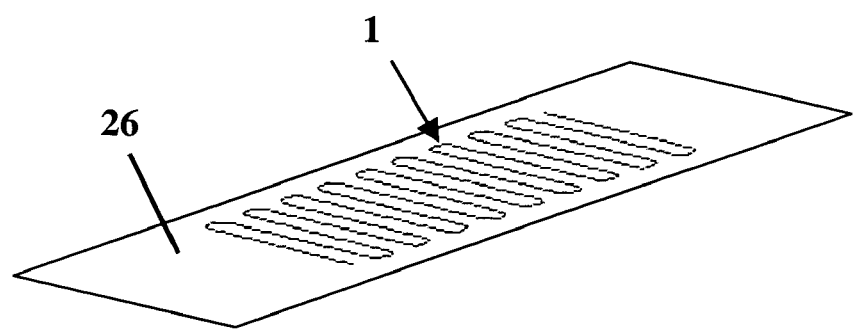

The invention shall be described in more detail below with reference to the appended schematical drawings, wherein FIG. 1 illustrates a perspective view of a flexible structure according to the invention, FIG. 2 is a perspective view of the flexible structure of FIG. 1, FIG. 3 is a perspective view of a flexible structure according to the invention, FIG. 4 is a perspective view of the flexible structure of FIG. 3, FIG. 5 is a side view of a mobile communications apparatus comprising two main parts and a hinge structure according to the invention, FIG. 6 is a side view of the apparatus of FIG. 5 in another situation, FIG. 7 is a front view of a mobile phone having a lens of a digital camera and a shutter on the lens in closed position, FIG. 8 is a front view of the mobile phone of FIG. 7 having the shutter in open position, FIG. 9 is a side view of the situation of FIG. 7, FIG. 10 is a side view of the situation of FIG. 8, FIG. 11 is a perspective view of a mobile communication apparatus with a shutter structure according to the invention, FIG. 12 is a partly transparent view of the situation in FIG. 11, FIG. 13 shows a flexible structure according to the invention in two different perspective views, FIG. 14 is a perspective view of a flexible structure according to the invention and FIG. 15 is a perspective view of a flexible structure attached to a flexible display.

A DETAILED DESCRIPTION OF PREFERRED EMBODIMENTS

In the following the same reference numbers are used for corresponding details in different embodiments when suitable.

FIG. 1 illustrates one embodiment of a flexible structure 1 according to the invention. The flexible structure 1 comprises a plurality of elongated bars 2 substantially parallel to each other. Connectors 3 at the end parts of the bars 2 connect neighboring parallel bars to each other. At the first end part 4 of the flexible structure 1 connectors 3 on both end parts of the first four bars connect the bars together. Only one connector 3 is arranged between the fourth and the fifth bar. The same applies for the second end part 5 of the structure. Connectors 3 on both end parts of the last four bars connect the bars together. Between these two end parts of the structure, connectors 3 on two sides of one bar are situated on different end parts of the bar whereby the parallel bars 2 and the connectors between them define a zigzag structure.

FIG. 2 illustrates the flexible structure 1 of FIG. 1 in a situation, where the first and second end parts 4 and 5 are bended approximately 180° in relation to each other. FIG. 2 clarifies a basic idea behind the invention: with the flexible structure 1 according to the invention one is able to bend a flat or plate-like object, i.e. the flexible structure 1, easily and without causing major stress on the structure. The structure of the invention divides the total rotation in the structure in between several torque bars. In the embodiment of FIGS. 1 and 2 the eight parallel bars 2 between the first and second end part 4 and 5 together form a bending part 6.

In the embodiment of FIGS. 1 and 2 the parallel bars 3 are made of an elastic material in such a way that the first end part 7 and the second end part 8 of one bar 2, see FIG. 2, are arranged rotatable in relation to each other around the length axis of the bar. The connectors 3 between two neighboring bars 2 are made at least mainly inflexible. This way relative rotation between the two connected bars on the point of connection is at least substantially prevented. With this kind of an arrangement, all the bending in the situation of FIG. 2 takes place as distortion in the eight bars 2 being part of the bending part 6 of the flexible structure 1. Each of these eight bars takes care of ⅛ of the total bending of approximately 180°, i.e. approximately 22.5°. In other words, if situations in FIGS. 1 and 2 are compared to each other, the first end part 7 and the second end part 8 of the bar 2 in FIG. 2 have been rotated approximately 22.5° in relation to each other.

Suitable materials for the elastic bars 2 are e.g. superelastic alloys, spring steel and some plastics. The bars 2 of the invention can naturally vary in size. If the flexible structure 1 is used for example as a hinge structure in a mobile communications apparatus a suitable thickness of the bar 2 could be between 0.5–4 1.5 mm. The connectors 3 can be arranged at the points of connection in many different ways.

The neighboring bars could be attached to each other e.g. by welding or the two bars cold be molded together in one piece. It is also possible to arrange a separate connector part between the two bars. Further, the connectors 3 can be made of the same material as the bars 2. One or more of the connectors 3 and bars 2 can even be made as one single piece of one single material.

Due to the elasticity of the bars 2 the flexible structure 1 acts to some extent as a spring. This spring effect gives a nice, firm and secure feeling to a user bending or straightening the flexible structure 1. The spring effect can be used e.g. to automatically close a hinge, or to resist too much opening of a hinge.

FIGS. 3 and 4 illustrate a flexible structure 1 of the present invention, comprising a layer 9 of soft material, in this case silicon. Silicon has been molded on both sides of the parallel bars 2 and connectors 3 visible in FIGS. 1 and 2. Other materials would be suitable as well. The silicon ties the free end parts of the bars together. With free end parts is meant neighboring end parts of bars, which do not have a connector between them. The silicon keeps the bars parallel to each other and prohibits movement of the neighboring bars in relation to each other. Soft silicon layer around the flexible structure 1 protects the structure against mechanical damage. Silicon or other similar materials also act as a damper on the spring of the structure, thereby facilitating smooth bending of the flexible structure. In FIGS. 3 and 4 the silicon coverings on the first and second end parts of the flexible structure are presented with different colour than the silicon covering on the bending part 6 of the flexible structure. Possible electronic and data transfer connections are suitably arranged inside the soft layer 9. The flexible structure of FIGS. 3 and 4 could be used e.g. as a hinge structure according to the invention.

FIGS. 5 and 6 show a mobile communications apparatus 10 comprising two main parts 11, 12 and a hinge structure 13 according to the invention between these main parts. The hinge structure can be of the type shown in FIGS. 3 and 4. The first and second end parts 4 and 5 of the structure (see FIGS. 3 and 4) are situated firmly in the main parts 11 and 12 of the mobile communications apparatus 10. The two main parts 11 and 12 both have electronic functions. Both electronic and data transfer connections have to be established between these parts 11 and 12.

The hinge structure 13 according to the invention provides a reliable and safe way to lead the connections needed. The flexible structure of the invention is bendable, but it is easy to dimension the bars and connectors in such a way that the maximum bending angle is suitable for each need. FIG. 6 shows a situation where part 12, for instance a display is opened to its normal maximal opening angle. The hinge structure is dimensioned in such a way, that the lid part 12 stop at the position shown FIG. 6.

FIGS. 7–10 show a part of an electronic apparatus 14, e.g. a mobile phone or some other mobile communications apparatus. The electronic apparatus 14 comprises a digital camera, lens 15 of which can be seen in the FIGS. 7–10. A shutter structure 16 according to the invention is arranged to cover or to reveal the lens 15 when desired. The shutter structure 16 comprises the flexible structure 1 of the invention. The sides 17 and 18 of the shutter are arranged to be slid in guide elements arranged at least substantially parallel to the sides 17 and 18 of the slidable shutter. The guide elements are not shown in the FIGS. 7–10, but they can be formed for example as simple rails supporting the sides 17 and 18 of the shutter 16. FIGS. 7 and 8 show views where one clearly sees how the lens 15 can be covered (FIG. 7) or revealed (FIG. 8). FIGS. 9 and 10 show the same situations in side views. FIGS. 7–10 are very schematical. The flexible structure of the invention with its parallel bars 2 and connectors 3 is clearly seen.

FIGS. 11 and 12 show a mobile communications apparatus 19, which comprises a display 20 and a flexible shutter 21. Shutter 21 comprises the flexible structure of the invention with the zigzag structure comprising parallel, elastic bars 2 and connectors 3 between them. The apparatus 19 has parallel, longitudinal recesses 22 on two sides of the display 20. Recesses 22 are arranged to receive and support the sides 23 and 24 of the flexible shutter 21. The shutter 21 can be slid to cover the display 20 or it can be slid to reveal the display 20. In FIG. 11 it is shown how the flexible shutter 21 can be slid into a space 25 formed under the display 20, inside the mobile communications apparatus 19. The flexible shutters according to the invention can be operated e.g. manually or with the help of an electric motor.

FIGS. 13 and 14 show two more embodiments of the flexible shutter structure 1 of the invention. In these embodiments the elastic bars and the connectors are of one and the same piece of material. FIG. 13 presents a zigzag structure 1 made of a single metal wire. The same wire structure 1 is shown unbent and bent. FIG. 14 shows a zigzag structure cut or pressed from a sheet or plate of metal. In FIGS. 1–15 all points of connection and the connectors 3 connecting two neighboring bars 2 are situated on the end parts of the bars 2. In some embodiments of the invention one or more of the points of connection and the connectors connecting two neighboring bars can be arranged on the middle parts of the parallel bars.

FIG. 15 shows a further embodiment of the invention. Here it is very schematically presented a flexible structure 1 according to the invention arranged as a part of a of a flexible display arrangement. The structure 1 is attached on the backside of a flexible display 26. Here the flexible elastic structure 1 is used as a support structure for a relatively thin and flexible display sheet 26. It is possible to design the flexible structure 1 of the invention to have a certain minimum bending radius, depending on the materials used and the dimensions of for example the elastic bars and the connectors. Because many flexible apparatuses, e.g. the flexible display 26 have a certain minimum bending radius, the flexible structure 1 of the invention can be used as a limiter. One embodiment of this kind of a support structure and bending limiter is shown in FIG. 15.

For a person skilled in the art, it is obvious that the invention is not restricted to the above-described examples only, but it may vary within the scope of the claims set forth below. The flexible structure of the invention can be designed for various different purposes. The invention can be used in many kinds of apparatuses. The flexible structure can vary in size.

The invention claimed is:

1. A flexible structure comprising a plurality of elongated bars having a length axis and being connected to each other, wherein:
   the bars are arranged at least mainly parallel to each other,
   each bar has a first end part, a second end part and a middle part between the end parts,
   at least two neighboring ones of the parallel bars are connected to each other by a connector at their point of connection,
   at least some of the parallel bars are elastic in such a way that the first end part and the second end part of one bar are arranged rotatable in relation to each other around the length axis of the bar.

2. A flexible structure according to claim 1, wherein the connector arranged between two neighboring parallel bars is at least mainly inflexible, in order to prevent relative rotation between the two connected bars on the point of connection.

3. A flexible structure according to claim 1, wherein the connector arranged between two neighboring parallel bars is at least mainly inflexible, in order to prevent relative movement between the two connected bars at least in the direction of the length axes of the bars.

4. A flexible structure according to claim 1, wherein at least two neighboring parallel bars are arranged elastic.

5. A flexible structure according to claim 4, wherein the connector is arranged between two neighboring parallel elastic bars.

6. A flexible structure according to claim 1, wherein connectors on two sides of one bar connecting the bar to its both neighboring bars are situated on different parts of the bar.

7. A flexible structure according to claim 1, wherein connectors on two sides of one bar connecting the bar to its both neighboring bars are situated on different end parts of the bar whereby the parallel bars and the connectors between them define a zigzag structure.

8. A flexible structure according to claim 1, which comprises an elastic material layer, inside which layer the parallel bars and the connectors between them are arranged.

9. A flexible structure according to claim 1, wherein the structure comprises
   a first end part of the structure on the side of the first of the parallel bars and a second end part of the structure on the side of the last of the parallel bars,
   a first side of the structure on the side of the first end parts of the parallel bars and a second side of the structure on the side of the second end parts of the parallel bars.

10. A flexible structure according to claim 9, which further comprises an electric conductor arranged to conduct electric current from the first end part of the structure to the second end part of the structure.

11. A flexible structure according to claim 9, which further comprises a data conductor arranged to conduct electric data from the first end part of the structure to the second end part of the structure.

12. A flexible structure according to claim 1, wherein at least one of the bars and at least one of the connectors attached to it are made of one and single piece of material.

13. A flexible structure comprising:
   a plurality of elongated bars arranged generally parallel to one another, wherein each bar comprises a first end part, a second end part and a middle part between the first and second end parts; and
   at least one connector connecting two adjacent ones of the bars to each other,
   wherein each of the adjacent bars is adapted to elastically twist about a longitudinal axis of the bar such that the first end part and the second end part of each adjacent bar are rotatable in relation to each other around the longitudinal axis of the bar.

14. A flexible structure as in claim 13 wherein the at least one connector comprises a first connector on a first one of the bars at a first end part of the first bar connected to a second one of the bars, and a second connector on the first bar at an opposite second end part of the first bar connected to a third one of the bars.

15. A flexible structure as in claim 13 further comprising an elastic material layer, wherein the bars are located inside the elastic material layer.

16. A flexible structure as in claim 13 the bars are comprised of a superelastic alloy.

17. A flexible structure as in claim 13 wherein the bars and the at least one connector form a general zigzag structure.

18. A flexible structure as in claim 13 wherein the at least one connector is substantially inelastic.

19. A flexible structure as in claim 13 wherein the bars comprise torsion bars.

20. A hinge structure comprising a flexible structure as in claim 13.

21. A mobile communications apparatus comprising:

a first main part;

a second main part; and a flexible structure as in claim 13 movably connecting the second main part to the first main part.

* * * * *